Patented Jan. 18, 1949

2,459,298

UNITED STATES PATENT OFFICE 2,459,298

PLASTIC COMPOSITIONS MADE WITH VULCANIZED, POLYETHYLENE GLYCOL ESTERS AS PLASTICIZERS

Paul Stamberger, Stamford, Conn.

No Drawing. Application November 17, 1944,
Serial No. 563,989

2 Claims. (Cl. 106—180)

The present invention relates to the manufacture of new products containing polyethylene glycol esters of unsaturated long chain fatty acids.

The polyethylene glycol esters of long chain fatty acids are volatile to a certain extent and evaporate at room temperature when exposed to the atmosphere, especially when a large surface thereof is exposed to the atmosphere. Such volatility is disadvantageous if these esters are used as plasticizers. Plastic masses containing volatile plasticizer stiffen with the loss of the plasticizer and lose their flexibility and extensibility. Apart from the volatility, the plasticizing action of such polyethylene glycol esters is not satisfactory. The quantity required to obtain the desired flexibility and/or extensibility also decreases considerably the softening point of the plastic masses to which such esters are added and reduces the tensile strength. Furthermore, when plastic masses containing such plasticizers are subjected to an elevated temperature they are frequently irreversibly softened and remain sticky and lose their strength.

The present invention is based on the discovery that products may be obtained from such polyethylene glycol esters of long chain unsaturated fatty acids by a process of vulcanization, which products are practically non-volatile and which as plasticizers act much more satisfactory than the unvulcanized products. For the purpose of the present invention, plastic masses or plastics, natural or synthetic products are to be understood as such which are deformable on heating and which do not show elasticity at room temperature in the absence of plasticizers. Such plastic masses are, for example, cellulose esters and ethers, polyvinyl esters and similar products, polyacrylates, etc.

The fatty acids which are especially suitable for the producing of the polyglycol esters to be vulcanized, for the purpose of the present invention are fatty acids having a chain length of at least 16 carbon atoms and one or more double bonds. The presence of a hydroxyl radical in the fatty acid chain is often of advantage. By the vulcanization process, products may be produced which are thickened considerably and which are not volatile at the temperatures to which plastic masses are usually exposed. Therefore, such vulcanized plasticizers do not volatilize gradually even during prolonged storage. In this manner by such plasticizers, undesirable stiffening of the plastic masses during storage will be prevented, and besides this, the flexibility and extensibility of the masses will be considerably increased without impairing the softening point and the tensile properties of the plastics.

The properties of the vulcanized polyglycol esters differ considerably from generally known vulcanized fatty oils. Such vulcanized fatty oils are elastic solid masses, insoluble in solvents, whereas the vulcanized polyglycol esters are viscous liquids and no variation of the method of vulcanization or the addition of excess of vulcanizing agent will yield a product having identical properties with the vulcanized fatty oils. However, the main difference between the two products exists in their behavior towards plastic masses, with which vulcanized fatty oils are not compatible.

The process of vulcanization can be carried out in different ways; for example, by heating the said esters at elevated temperature with sulfur or by reacting sulfur monochloride with the esters at room temperature or by means of other vulcanizing agents which are in their action equivalent to the above mentioned compounds.

The optimum amount of vulcanizing agent and the best method of vulcanizing will depend on the unsaturation of the fatty acid radical and also on the use for which it is intended; for example, oleic acid esters require about 10% sulfur chloride to give optimum effects. For a sulfur vulcanized product 5-20% sulfur is necessary. In this latter case the reaction with the sulfur is effected at elevated temperature, for example, between 130 and 160° C. For the treatment with sulfur chloride on the other hand, cooling is advisable to prevent darkening of the product. Another vulcanizing agent is, for example, dithiocyanogen. A modification of the sulfur vulcanization, yielding products with light color, is the vulcanization by heating the oil with sulfur in the presence of hydrogensulfide, as described for the vulcanization of fatty oils in United States patent to Gottesmann, No. 2,152,185, March 28, 1939.

The compatibility with various plastic substances can be adjusted in different ways; for instance, in using fatty acid esters with polyglycols of different chain length, or by choosing a fatty acid which will improve the compatibility by the presence of radicals as hydroxyl in the hydrocarbon chain.

The present invention is also based on the discovery that the vulcanized polyglycol esters when compared with the non-vulcanized products show improved compatibility with various plastic masses, especially with cellulose esters and ethers and certain polyvinyl chloride-acetate copolymers such as those containing over 10% acetates.

Examples of polyethyleneglycols suitable for forming esters for vulcanization are: tetraethylene, hexaethylene, nonaethylene, dodecaethylene glycols. Examples of fatty acids are: oleic, linoleic, eleostearic, arachidonic, clupanodonic, etc.

The incorporation of the vulcanized esters as plasticizers into the plastic masses can be carried out by mixing such plasticizers with the plastics directly at elevated temperature in suitable mixing equipment, for example, an internal mixer or a mixing roller, or such plasticizers can be incorporated in a solution of the plastics in a suitable solvent. It is also possible to combine the two components in a water dispersion.

It is frequently of advantage to use mixtures of such vulcanized polyethylene glycol esters with other known plasticizers. By such mixtures the properties of a product may be influenced, for example, a small quantity of plasticizers which are soluble in the plastics greatly increase the elongation and the elasticity of the products containing the vulcanized polyethylene glycol esters. Such soluble plasticizers suitable for use with polyvinyl chloride type of plastics are dioctylphthalate, tricresylophosphate and the like.

Examples 100 parts of tetraethylene glycol dioleate, a thin liquid, has been mixed at 10° C. with 10 parts of sulfurmonochloride. An immediate reaction took place and the temperature increased in the reaction vessel to 25° C. After 6 hours of standing, no more unreacted sulfurmonochloride remained and a thick yellow colored liquid was formed. The evaporation loss of this product, when exposed to 120° C. in a 4 mm. thick layer presenting or exposing a surface of 35 cm.$^2$ for 5 days has been determined to be 3%, compared with 16% of an unvulcanized ester. The vulcanized product can be used as a plasticizer for ethyl cellulose. When equal quantities of ethylcellulose and said plasticizer were mixed together a flexible light colored film with little extensibility was obtained. This product has only shown little softening when heated to 100° C. and no loss in the tensile properties took place. This product was different from the product made with the unvulcanized ester, which gave in similar proportions a soft extensible film, which melted at 100° to a viscous liquid.

100 parts of hexaethyleneglycol dioleate was heated with 20 parts of sulfur at 160° for 4 hours. After this time all the sulfur was combined with the ester and a thick, brown liquid was formed. This product was soluble in a great variety of solvents, for example, in ketones, in hydrocarbons and in chlorinated hydrocarbons. Furthermore, it was compatible with a great number of plastics, such as nitrocellulose and polyvinychloride-acetate copolymer of the low viscosity type with ethylcellulose and cellulose acetate and the like. It was only partically compatible with polyvinylchloride, more than 20 parts separating from the compound on the surface. This separation could be prevented if a mixture of dioctylphthalate and the vulcanized hexaethyleneglycoldioleate have been used as plasticizers, in a proportion of 1 to 3.

What I claim is:

1. A plastic composition consisting of a thermoplastic film-forming material from the class consisting of cellulose esters and cellulose ethers and as a plasticizer, vulcanized polyethylene glycol ester of an unsaturated long chain fatty acid having at least 16 carbon atoms in the chain and at least one double bond.

2. A plastic composition consisting of ethylcellulose and vulcanized tetraethylene glycol dioleate.

PAUL STAMBERGER.

REFERENCES CITED

The following references are of record in the file of this patent:

UNITED STATES PATENTS

| Number | Name | Date |
|---|---|---|
| 1,928,528 | Wecker | Sept. 26, 1933 |
| 2,326,602 | Allen | Aug. 10, 1943 |
| 2,341,464 | Meyer | Feb. 8, 1944 |
| 2,356,586 | Hentrich et al. | Aug. 22, 1944 |
| 2,359,750 | Collins | Oct. 10, 1944 |

Certificate of Correction

Patent No. 2,459,298. January 18, 1949.

PAUL STAMBERGER

It is hereby certified that errors appear in the printed specification of the above numbered patent requiring correction as follows:

Column 3, line 4, after the word and comma, "linoleic," insert *linolenic,*; column 4, line 27, claim 1, before "vulcanized" insert *a*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*